United States Patent [19]

Borchardt et al.

[11] Patent Number: 5,383,044
[45] Date of Patent: Jan. 17, 1995

[54] SYSTEMS, METHODS AND APPARATUS FOR TRANSMITTING RADIO FREQUENCY REMOTE CONTROL SIGNALS

[75] Inventors: Robert L. Borchardt, New York; William T. McGreevy, Babylon; Efrain Rodriguez, Brooklyn, all of N.Y.

[73] Assignee: Recoton Corporation, Long Island City, N.Y.

[21] Appl. No.: 947,705

[22] Filed: Sep. 18, 1992

[51] Int. Cl.6 .................................... H04B 10/00
[52] U.S. Cl. ........................ 359/145; 340/825.72
[58] Field of Search ............... 359/145, 142, 146, 147, 359/148, 149, 154, 44; 340/825.72, 825.69; 455/352, 151.4; 341/176; 358/194.1

[56] References Cited

U.S. PATENT DOCUMENTS

| | | | |
|---|---|---|---|
| 3,513,443 | 5/1970 | Andersen | 340/825.44 |
| 4,149,186 | 4/1979 | Chung et al. | 358/83 |
| 4,259,746 | 3/1981 | Sandstedt | 359/145 |
| 4,264,982 | 4/1981 | Sakarya | 359/146 |
| 4,394,691 | 7/1983 | Amano et al. | 358/194.1 |
| 4,509,211 | 4/1985 | Robbins | 359/145 |
| 4,622,681 | 11/1986 | Snell et al. | 375/48 |
| 4,709,412 | 11/1987 | Seymour et al. | 359/145 |
| 4,809,359 | 2/1989 | Dockery | 359/145 |
| 4,843,635 | 6/1989 | Okazaki | 359/142 |
| 5,023,943 | 6/1991 | Heberle | 359/142 |
| 5,073,979 | 12/1991 | Webb | 359/142 |
| 5,142,397 | 8/1992 | Dockesy | 359/145 |
| 5,191,324 | 3/1993 | Rydel | 359/142 |

FOREIGN PATENT DOCUMENTS 3244712 6/1984 Germany.

OTHER PUBLICATIONS

"UHF Microtransmitter", 1989, RF Monolithics, Inc., Dallas, Tex. (4 pages).
"MX 1019 UHF Microtransmitter", 1990, RF Monolithics, Inc., Dallas, Tex. (1 page).

Primary Examiner—Douglas W. Olms
Assistant Examiner—Dang Ton
Attorney, Agent, or Firm—Curtis, Morris & Safford

[57] ABSTRACT

Systems, methods and devices are provided for remotely transmitting a control command to a device having a light sensor for receiving the control command in the form of a light energy signal. A radio frequency remote control signal is produced within an enclosure of a remote control unit (such as a hand-held remote control unit) and is radiated therefrom to a radio frequency receiver. The receiver converts the received signal to a light energy signal which it applies to the light sensor of the device to provide the command thereto.

41 Claims, 4 Drawing Sheets

SYSTEMS, METHODS AND APPARATUS FOR TRANSMITTING RADIO FREQUENCY REMOTE CONTROL SIGNALS

BACKGROUND OF THE INVENTION

The present invention relates to systems, methods and apparatus for transmitting radio frequency remote control signals which are particularly advantageous for use in extending the effective operational range of remote control systems employing transmission of control signals in the form of light energy to a controlled device.

A variety of devices are presently in use which are provided with remote control units utilizing light energy as a means of transmission. Many such devices are in common use in the home. Examples of such devices are television receivers, cable converters, VCR's, video disk players, audio reproduction equipment such as compact disk and magnetic tape reproducing equipment, amplifiers, receivers, etc. Each is provided with a device specific hand-held remote control unit which usually employs infrared light as a transmission medium. Typically, the hand-held remote control unit is provided with a number of push button switches for entering control signals manually, encoding circuitry for producing a coded electrical signal uniquely identifying the manually entered command and an infrared light emitter driven to emit infrared light signals corresponding with the encoded commands.

In such systems, the controlled device is provided with an infrared detector to receive the infrared command signal from the hand-held remote control unit and convert the same to an electrical signal to which the remotely controlled device responds by executing the corresponding command. In the case of a remotely controlled television receiver, for example, the command may effect a channel change, volume adjustment, audio mute, or other action which it is convenient for the viewer to implement remotely.

In order to consolidate the functions of multiple remote control units in a single device, hand-held remote control units (also referred to as multi-device units herein) are known which store remote control command codes for various commercially available remotely controlled apparatus such as televisions, VCR's, cable converters and audio devices. Some multi-device units provide the ability to "learn" the codes used by the remote control units specific to such apparatus. Such multi-device units typically emit infrared light signals coded in accordance with the stored codes specific to the various devices to be controlled, and thus serve to replace multiple device-specific remote control units. In order to "learn" the remote control codes of the device-specific remote control units, the multi-device units are provided with an infrared receiver and a microcomputer which can be programmed to store each code for each device to be controlled when the device-specific control unit is operated to transmit the code to be stored to the infrared receiver.

A remote control unit utilizing light energy signal transmission typically must be pointed in the direction of the remote control receiving window of the controlled device to ensure that the command will be received. Moreover, there may be no intervening objects between the remote control unit and the receiving window which might block the line-of-sight transmission path to the window. Such remote control systems are inherently limited to operation within a single room since the intervening walls of the room block transmission of the line-of-sight remote control signals to devices outside the room. This is especially disadvantageous where it is necessary to exercise control of equipment located remotely from a viewer or listener in a different room. For example, a viewer may wish to control a VCR having an infrared remote control system located in a different room reproducing a television signal which is transmitted wirelessly to a television in the viewer's room. A viewer may find it inconvenient to walk to the room where the VCR is located in order to exercise control of the VCR.

U.S. Pat. No. 4,809,359 shows a system for extending the effective operational range of an infrared remote control system which has a first repeater positioned near a remote control unit to receive infrared commands therefrom. The first repeater generates a corresponding radio signal representative of the received infrared signal from the remote control unit. A second repeater adjacent to the controlled device includes a radio receiver which receives the radio signal from the radio transmitter in the first repeater and transmits a corresponding infrared signal toward the controlled device.

While the system shown in U.S. Pat. No. 4,809,359 thus enables an extension of the operational range of an infrared remote control system to other rooms, it is still necessary for the user to ensure that the infrared signal emitted by the remote control unit can be received by the first repeater. This can be distracting and inconvenient for the viewer or listener.

Moreover, the system of U.S. Pat. No. 4,809,359 is relatively complex since it requires the use of two repeaters in addition to the remote control unit. Since the repeaters are located remotely from one another, each typically requires its own source of electrical power (such as an AC/DC converter which must be plugged into a power socket), which adds further to the complexity and inconvenience of the system.

OBJECTS AND SUMMARY OF THE INVENTION

Accordingly, it is an object of this invention to provide systems, methods and devices which avoid the above-mentioned disadvantages and problems associated with the known systems and devices.

It is a further object of this invention to provide systems, methods and devices for extending the effective operational range of line-of-sight remote control systems which are easy to use and less complex than existing techniques.

It is another object of this invention to provide radio frequency remote control systems, methods and devices which efficiently and effectively communicate remote control signals.

In accordance with one aspect of the present invention, a method is provided for remotely transmitting a control command to a device having a light sensor for receiving the control command in the form of a light energy signal, comprising the steps of: providing a remote control unit having a user operable control signal input on an enclosure of the remote control unit for receiving a control signal from a user representing a control command for the device, the remote control unit including a radio frequency signal generator within the enclosure; actuating the user operable control signal input to input a control signal to the remote control unit representing the control command; producing a corresponding radio frequency remote control signal within the enclosure with the use of the radio frequency generator in response to the input control signal; radiating the radio frequency remote control signal from the remote control unit; receiving the radiated radio frequency remote control signal; and transmitting the control command in the form of a light energy signal to the light sensor of the device in response to the received radio frequency remote control signal.

In accordance with another aspect of the present invention, a system for remotely transmitting a control command to a first device having a light sensor for receiving a control signal in the form of a light energy signal for effecting a predetermined control of the first device, comprises: a self-contained remote control unit including: an enclosure; a user operable control signal input on the enclosure for receiving a control signal from a user representing a control command for effecting a predetermined control of the first device; radio frequency generator means for producing a radio frequency signal within the enclosure in response to the control signal, the radio frequency signal corresponding with a light energy signal capable of effecting the predetermined control of the first device when supplied to a light sensor thereof; and means for radiating the radio frequency signal from the self-contained remote control unit; the system further comprising receiving means for receiving the radiated radio frequency signal and providing the light energy signal to the light sensor of the first device based on the received radio frequency signal.

In accordance with a further aspect of the present invention, a self-contained remote control unit for transmitting a radio frequency signal representing a predetermined control of a device wirelessly to a receiver/light energy signal generator for transmitting a light energy signal corresponding with the radio frequency signal to the device to effect the predetermined control of the device, comprises: an enclosure; a user operable control signal input on the enclosure for inputting a user command signal representing the predetermined control of the device; radio frequency generator means for producing a radio frequency signal within the enclosure in response to the user command signal, the radio frequency signal corresponding with a light energy signal capable of effecting the predetermined control of the device represented by the user command signal; and means for radiating the radio frequency signal from the self-contained remote control unit to the receiver/light energy signal generator.

It will be appreciated that the above method, system and device avoid the need to provide a repeater to receive a light signal from a hand-held unit and convert the same to a radio frequency signal for transmission to a second repeater. Rather, a radio frequency generator is employed to produce a radio frequency remote control signal within an enclosure which is provided with a user operable control signal input, so that the hand-held unit and the repeater may be replaced by a single device. Such systems, methods and devices can be readily implemented with the use of hand-held remote control units which serve to input a user command and transmit the same in the form of a radio frequency signal to a receiver/repeater unit which converts the received radio frequency signal to a light energy signal (such as an infrared remote control signal) and in turn provides the light energy signal to the device to be controlled, such as a television or VCR. It will be seen that, since the user operable unit does not transmit a light signal to the repeater, it is unnecessary for the user to suffer the distraction of pointing the unit at another device to ensure that a light signal will be received thereby. Moreover, the effective operational range of a remote control system can be extended without the need to provide two repeaters, since only a single unit is necessary to convert the radio frequency signal to a light energy signal which may be supplied directly to the device to be controlled.

In accordance with yet another aspect of the present invention, a method of transmitting a serial bit encoded remote control signal for controlling a remotely controlled device via radiated radio frequency energy from a remote control unit having at least one user actuatable control signal input, comprises the steps of: producing a serial bit encoded control signal in response to actuation of the control signal input by a user; producing a power control signal having an ON state and an OFF state, such that the power control signal switches from its OFF state to its ON state approximately at the commencement of the serial bit encoded control signal and switches from its ON state to its OFF state approximately at the end of the serial bit encoded control signal; producing a radio frequency carrier; modulating the radio frequency carrier with the serial bit encoded control signal to produce a modulated radio frequency carrier; enabling a supply of power for producing the modulated radio frequency carrier in response to the ON state of the power control signal; disabling the supply of power for producing the modulated radio frequency carrier in response to the OFF state of the power control signal; and radiating the modulated radio frequency carrier for controlling the remotely controlled device.

In accordance with a still further aspect of the present invention, a remote control unit for transmitting a serial bit encoded remote control signal for controlling a remotely controlled device via radiated radio frequency energy, comprises: a user operable control signal input for inputting at least one user command signal for effecting a predetermined control of the remotely control device; control signal producing means for producing a serial bit encoded control signal in response to actuation of the control signal input by a user: means for producing a power control signal having an ON state and an OFF state, such that the power control signal switches from its OFF state to its ON state approximately at the commencement of the serial bit encoded control signal and switches from it ON state to it OFF state approximately at the end of the serial bit encoded control signal; RF generator means for producing a radio frequency carrier; means for modulating the radio frequency carrier with the serial bit encoded control signal to produce a modulated radio signal carrier; enabling means for enabling a supply of power for producing the modulated radio frequency carrier in response to the ON state of the power control signal and for disabling the supply of power in response to the OFF state of the power control signal; and means for radiating the modulated radio frequency carrier for controlling the remotely controlled device.

The method and remote control unit summarized above provide the capability of achieving superior signal separation between serial bit encoded control signals which are often produced in a closely spaced sequence.

Moreover, since the radio frequency carrier is produced in response to the power control signal, it is possible to minimize the energy usage in producing and transmitting the remote control signal, so that the above summarized method and remote control unit are particularly well adapted for battery operated systems.

In accordance with yet another aspect of the present invention, a self-contained remote control unit for transmitting a control signal to a device representing a predetermined control thereof via a selected one of a radiated radio frequency signal and a light energy signal, comprises: an enclosure; a user operable control signal input on the enclosure for inputting a user command signal representing the predetermined control of the device; radio frequency generator means for producing a radio frequency signal within the enclosure in response to the user command signal and representing a predetermined control of a device; means for radiating the radio frequency signal from the self-contained remote control unit; and light energy transmission means for wirelessly transmitting a light energy signal from the self-contained remote control unit in response the user command signal and representing a predetermined control of a device. The present invention in this aspect provides a self-contained remote control unit which can replace a number of other such devices, as it provides the ability to transmit a light signal for controlling a device within the same room as the user, as well as a device located remotely therefrom, for example, in another room. This is especially advantageous where, for example, a VCR is located remotely from the viewer in another room of a house as it reproduces a television signal which is then transmitted (for example, by wireless transmission means) to a television within the same room as the viewer. With the use of the present invention, therefore, the viewer is able to both control the television as well as the remotely located VCR with the use of a single self-contained remote control unit.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN PREFERRED EMBODIMENTS

Figure 1:
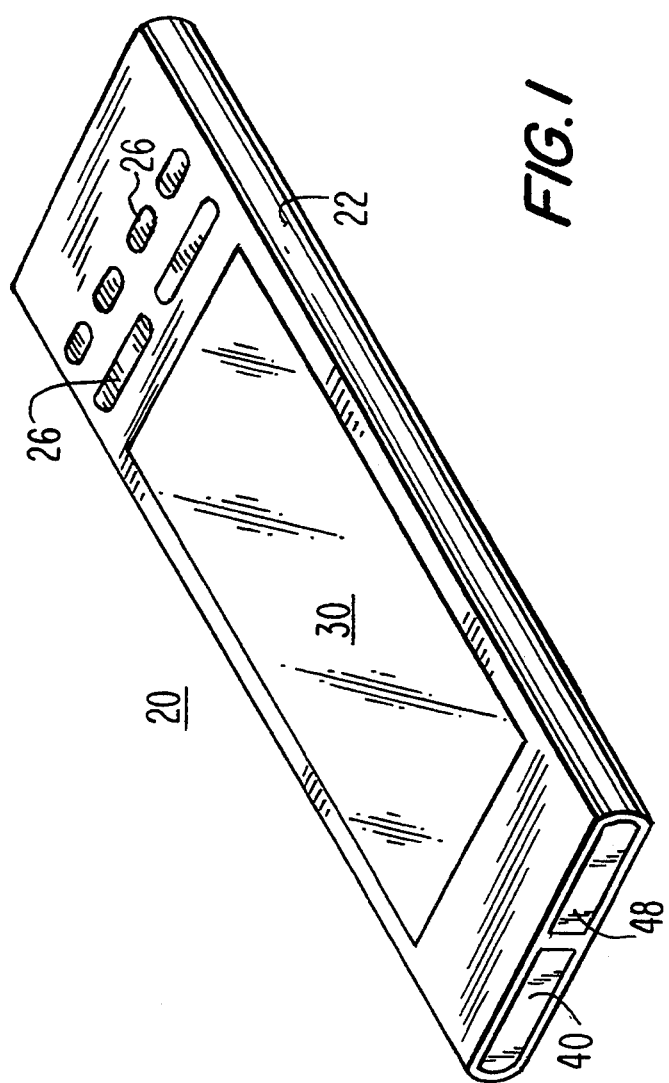
FIG. 1 is a three-dimensional illustration of a hand-held remote control unit in accordance with one embodiment of the present invention.

Referring to the drawings in detail, and presently to FIG. 1 thereof, it will be seen that a hand-held remote control unit 20 includes an enclosure 22 on which a plurality of push-button actuators 26 are mounted to permit a user to input commands for controlling the unit 20 and for controlling a remotely located device.

The unit 20 also includes an LCD display 30 visible through a surface of the enclosure 22 which is energized under the control of the unit 20 to provide a programmable touchscreen display specific to a selected device to be controlled. A plurality of touch sensitive switches are arranged beneath the display 30 to provide a further means for inputting user commands in accordance with the commands indicated by the display 30.

As will be explained in greater detail hereinbelow, the remote control unit 20 stores codes each representing a respective serial bit encoded light energy signal which, when supplied to a light sensor of a remotely controlled device, will effect a predetermined control of the device. For example, such device may be a remotely controlled television receiver having an infrared light sensor for receiving infrared light energy remote control signals for controlling such operations as channel selection, volume control, power ON/OFF, etc. As used herein, the terms "light" and "light energy" include visible light, infrared light, ultraviolet light and any other form of radiant energy which it is impractical to use as a means of transmitting remote control commands wirelessly through objects such as walls, ceilings, floors, and the like.

Among the stored codes, the remote control unit 20 includes a pre-programmed set of codes (for example, stored in the unit 20 at the time of manufacture) corresponding with the remote control codes of a number of commercially available devices such as television receivers, VCR's, cable converters, compact disk players, laser disk players, etc. A user is enabled by means of the push-button actuators 26 to select a particular one of the devices to be controlled and then input a desired control command for selecting the particular code for use in effecting the desired control of the selected device.

The unit 20 is also provided with an infrared light detector 48 which is used in a programming mode of the unit 20 to store remote control codes for additional devices. That is, to store the additional codes, the user selects a programming mode of the unit 20 by means of the push-button actuators 26 and/or touch sensitive switches beneath the display 30. Then for each code to be stored the actuators and touch sensitive switches are selected as appropriate to indicate a particular device and code to be stored. Thereafter a dedicated infrared remote control unit for the selected device is actuated to transmit an infrared light energy signal corresponding with the desired code to the infrared light sensor 48. The unit 20 responds by storing the code together with an indication of the corresponding device and command carried out by means of the code.

A remote control transmission mode of the unit 20 may also be selected by means of the push-button actuators 26 and/or touch sensitive switches. In this mode of the unit 20, the user may transmit a desired remote control signal to a remotely controlled device either via radio frequency transmission, as described in greater detail hereinbelow, or by means of a light energy signal in a form of a infrared light signal produced by an infrared LED light emitter 40.

The user selects the particular device to be controlled by means of the actuators 26 and/or touch sensitive switches beneath the display 30. The unit 20 responds by energizing the display 30 to display an array of commands, each overlayed on a respective touch sensitive switch which when actuated by the user causes the unit 20 to transmit a corresponding remote control signal (by infrared light or radio frequency transmission, as selected) to effect the desired control of the remotely controlled device.

Figure 2:
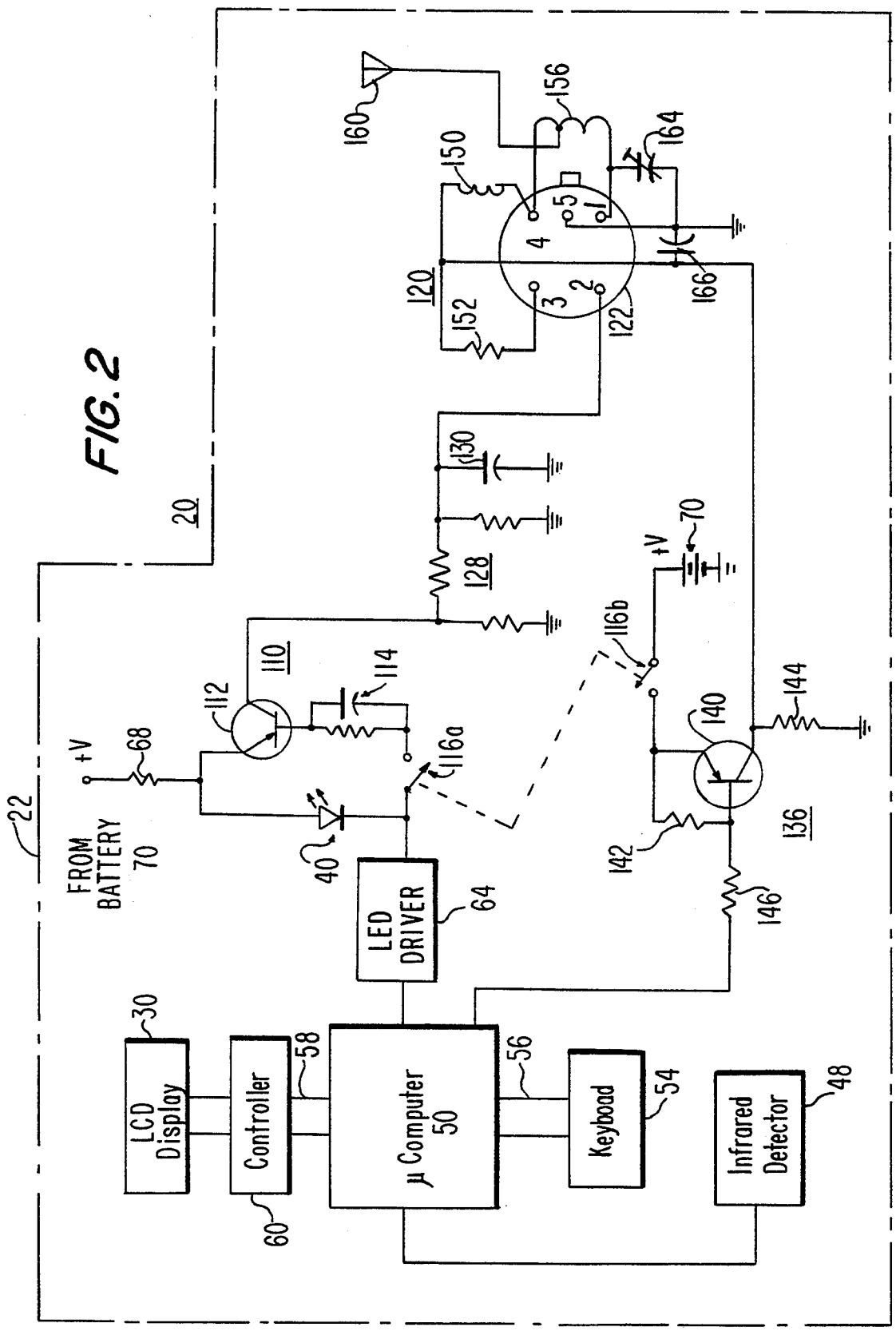
FIG. 2 is a circuit diagram of the remote control unit of FIG. 1.

With reference also to FIG. 2, the hand-held remote control unit 20 includes within its enclosure 22 a microcomputer 50 which both stores the remote control codes and exercises overall control of the unit 20. A keyboard 54 illustrated in FIG. 2 schematically represents both the switches actuated by the push-button actuators 26 as well as the touch-sensitive switches arranged beneath the display 30. The keyboard 54 is coupled directly with the microcomputer 50 by means of a keyboard bus 56. The microcomputer 50 provides display commands via a display bus 58 to a LCD controller 60 coupled with the LCD display 30 to control the display thereof in accordance with commands from the microcomputer 50. The infrared light detector 48 also is coupled with the microcomputer 50 to input serial bit codes converted by the detector 48 to electrical form to be stored by the microcomputer 50.

In the remote control transmission mode of the microcomputer 50, remote control commands input by the user by means of the keyboard 54 are used by the microcomputer 50 to access the appropriate code stored therein. The accessed code is used by the microcomputer 50 to generate a corresponding 40 to 80 kHz carrier pulse code modulated by a serial bit code group which the microcomputer 50 outputs to an LED driver 64, in accordance with a first embodiment of the present invention.

A positive power supply voltage +V is supplied from a power supply battery 70 to a first terminal of a resistor 68 having a second terminal coupled with the anode of the infrared LED light emitter 40. The cathode of the infrared LED 40 is coupled with an output of the LED driver 64 which drives the LED 40 to emit an infrared light signal corresponding with the pulse code modulated carrier. In this fashion, the unit 20 may be employed to directly project an infrared light remote control signal to a remotely controlled device within sight of the user, such as a television receiver within the same room.

As noted herein above, the unit 20 is also operative to transmit a remote control signal code via radio frequency transmission for exercising control of a device located, for example, in another room or otherwise situated so that it is impractical to transmit a light energy signal thereto directly from the unit 20. In this mode of operation, the unit 20 transmits a radio frequency carrier (such as a low power UHF carrier) modulated by the same pulse code modulated 40 to 80 kHz carrier used to drive the LED 40 for light energy transmissions. The transmitted radio frequency signal is received by a UHF receiver/light energy repeater unit (also referred to herein as the "receiver unit" and described in greater detail hereinbelow) which converts the radio frequency transmission to a light energy signal in the form of an infrared light energy beam which it supplies to an infrared light remote control sensor of the device to be controlled.

Figure 3:
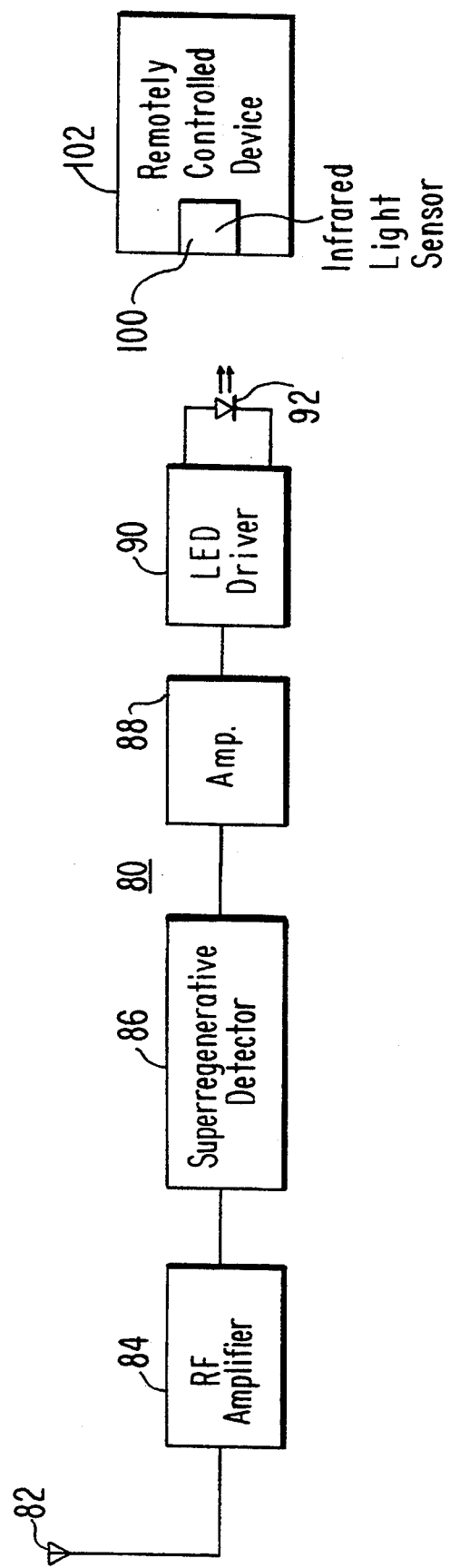
FIG. 3 is a block diagram of a receiver unit for receiving a radio frequency remote control signal transmitted by the remote control unit of FIG. 1 and converting the signal to an infrared remote control signal for controlling a remotely controlled device.

FIG. 3 is a block diagram of the receiver unit 80 which may be, for example, an RF receiver/infrared transmitter used in the IR-100 Wireless Remote Control Extender System supplied by Recoton Corporation, Long Island City, N.Y. The receiver unit 80 includes a receiving antenna 82 for receiving the UHF signal transmitted by the unit 20 and coupled with the input of an RF amplifier 84 which amplifies and supplies the received UHF signal to a superregenerative detector 86.

The superregenerative detector 86 serves both to select the received UHF signal from the frequency spectrum and demodulate the same to supply the pulse code modulated 40 to 80 kHz signal at an output thereof. The output of the detector 86 is supplied to an amplifier 88 which amplifies and supplies the pulse code modulated carrier to the input of an LED driver 90 which energizes an infrared LED 92 to emit a pulse code modulated carrier corresponding with the pulse code modulated carrier output by the LED driver 64 of the unit 20. The LED 92 is positioned to transmit an infrared light energy signal to an infrared light sensor 100 of a remotely controlled device 102.

Accordingly, when a user selects a desired control of the device 102 by appropriately actuating the keyboard 54 of the unit 20 in FIG. 2, the microcomputer 50 responds by producing the 40 to 80 kHz carrier modulated by a corresponding serial code group. The modulated carrier is supplied to the LED driver 64 causing the same to produce a pulse code modulated carrier which, when supplied in the form of an infrared light energy signal to the infrared light sensor 100 of the device 102, will effect the desired control thereof. The unit 20, in the radio frequency transmission mode thereof, modulates the UHF carrier with the pulse code modulated carrier output by the LED driver 64 and transmits the same to the receiver unit 80 of FIG. 3. The unit 80 responds by converting the received signal to an infrared light energy signal which it supplies to the sensor 100 of the remotely controlled device 102 to effect the desired control thereof.

Referring again to FIG. 2, the radio frequency transmitter subsystem of the unit 20 is now described in greater detail. A buffer amplifier and preemphasis circuit 110 includes a PNP transistor 112 and a preemphasis network 114 including the parallel combination of a resistor and a capacitor. The emitter of the PNP transistor 112 is connected with the second terminal of the resistor 68 to couple a positive supply voltage thereto and the base of the transistor 112 is connected with a first terminal of the preemphasis network 114. A second terminal of the preemphasis network 114 is connected with a first switch 116a of a pair of ganged switches which includes a second switch 116b. The switches 116a and 116b are arranged so that both are closed simultaneously in a first state for selecting the RF transmission mode of the unit 20 and both are opened in a second state in which RF transmission by the unit 20 is disabled. A second terminal of the switch 116a is coupled with the output of the LED driver 64. Accordingly, when the switch 116a is closed, the output of the LED driver 64 is supplied through the preemphasis network 114 to the base of the transistor 112. The transistor 112 supplies at its collector the pulse code modulated carrier produced by the LED driver 64 which has been amplified and in which high frequency components have been emphasized to compensate for the low pass characteristic of the superregenerative detector 86 of the receiver unit 80.

A UHF transmitter circuit 120 advantageously employs a UHF microtransmitter 122 which serves to produce a 418 MHz carrier amplitude modulated by the output of the buffer amplifier and preemphasis circuit 110. The UHF microtransmitter may be, for example, a type MX 1019 UHF microtransmitter supplied by RF Monolithics, Inc. of Dallas, Tex. The microtransmitter 122 is provided with five external pins numbered 1 through 5 in FIG. 2. Pin 2 of the microtransmitter 122 is a modulation input which is coupled with the collector of the transistor 112 through a resistive network 128 which serves both to match the output of the buffer amplifier and preemphasis circuit 110 with the modulation input of the microtransmitter 122 and to control the depth of modulation in the transmitter circuit 120. A capacitor 130 provides RF bypass between pin 2 of the microtransmitter 122 and ground.

A transmitter power control circuit 136 includes a PNP transistor 140 whose emitter is connected with a first terminal of the switch 116b. The second terminal of the switch 116b is connected with the source of positive power supply voltage +V. The base-emitter circuit of the transistor 140 is shunted by a biasing resistor 142 and the collector of the transistor 140 is coupled to ground through a collector resistor 144.

The base of the transistor 140 is coupled with an output of the microcomputer 50 through a base resistor 146 to receive a power control pulse therefrom. The output of the microcomputer 50 to the base of the transistor 140 is normally at a high level so that the transistor is cut off. However, at the commencement of each code group output as a pulse code modulated carrier by the microcomputer 50 to the LED driver 64, the output of the microcomputer 50 to the base of the transistor 140 switches to a low level. Accordingly, in the RF transmission mode in which the switch 116b is closed, the transistor 140 becomes conductive when its base is thus brought low thus to supply the positive power supply voltage to the collector thereof. The microcomputer 50 maintains the base of the transistor 140 at a low level until the termination of the code group, whereupon it brings the voltage at the base of the transistor 140 high. Accordingly, the positive power supply voltage is supplied at the collector of the transistor 140 only for the duration of the code group output by the microcomputer 50 to the LED driver 64 in the RF transmission mode.

The collector of the transistor 140 is coupled both with a power supply input pin 4 of the microtransmitter 122 through an RF choke 150 and with a power control pin 3 thereof through a resistor 152. Accordingly, the microtransmitter 122 is energized to produce the RF carrier only during such times that the code group is being supplied to its modulation input pin 2. Consequently, by thus controlling the supply of power to the microtransmitter 122, the modulation envelope of each code group is clearly defined thus to improve the reliability of the remote control system. In addition, by limiting the supply of power to the microtransmitter only to those short periods of time during which a code group is actually transmitted, the power drain from the power supply battery in the RF transmission mode is advantageously reduced.

The transmitter circuit 120 also includes an RF antenna coil 156 connected between an RF output pin 1 of the microtransmitter 122 and the supply voltage input pin 4 thereof. A transmitting antenna 160 is connected with a tap of the antenna coil 156. The transmitting antenna 160 may be, for example, a stretched wire antenna arranged within the enclosure 22. In alternative, the antenna 160 may be formed as a printed pattern on a printed circuit board of the unit 20.

Pin 5 of the microtransmitter 122 is connected to ground and a variable tuning capacitor is connected between the RF output pin 1 and ground. Finally, an RF bypass capacitor 166 is connected between ground and the collector of the power supply switching transistor 140.

Figure 4:
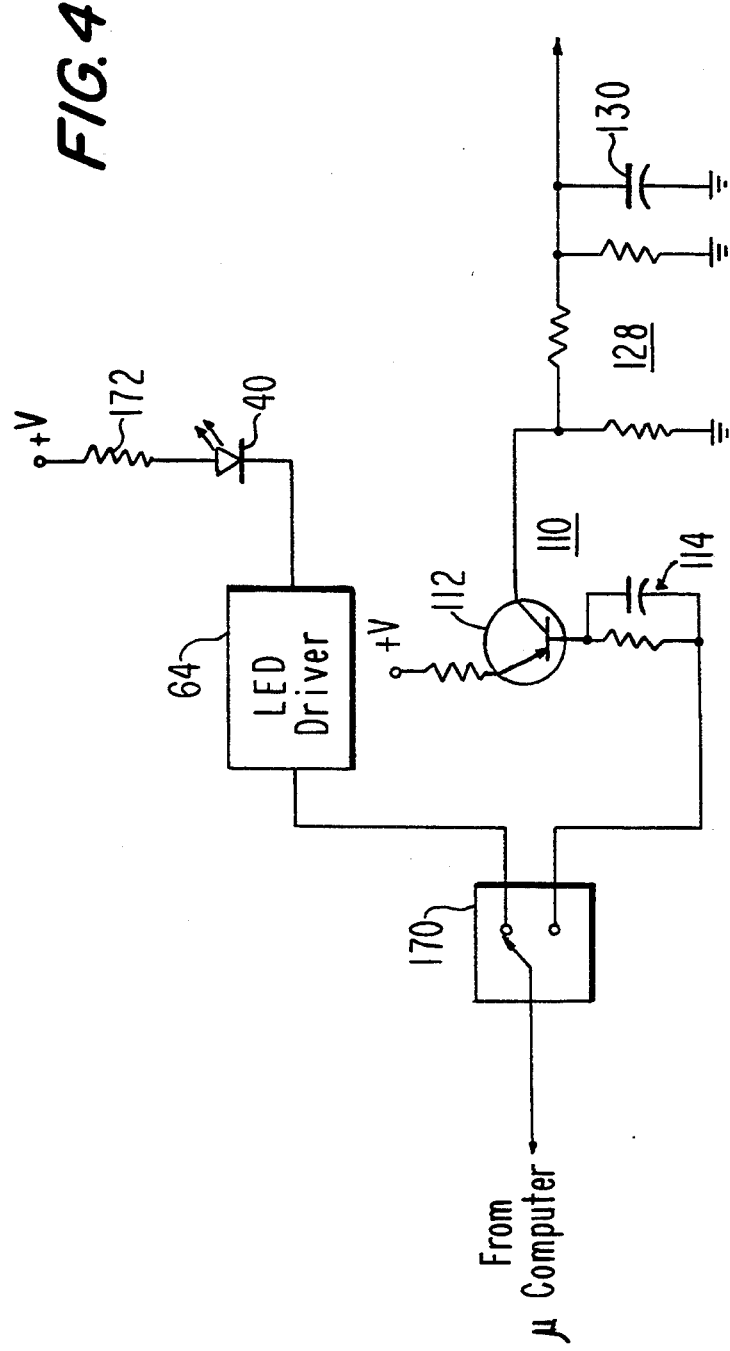
FIG. 4 is a circuit diagram of a portion of a further embodiment of a remote control unit in accordance with the present invention.

It will be appreciated that, in the embodiment of FIG. 2, the infrared LED 40 is energized both in the RF transmission mode as well as when the RF transmission mode is disabled. Referring now to FIG. 4, a second embodiment of the remote control unit 20 is illustrated therein. In FIG. 4, only the modifications of the second embodiment with respect to the first embodiment as illustrated in FIG. 2 are depicted and corresponding elements bear the same reference numerals. In FIG. 4, a single pole double throw switch 170 has a movable terminal coupled with microcomputer 50 to receive the pulse code modulated carrier therefrom. A first fixed terminal of the switch 170 is coupled with the input of the LED driver 64 whose output, as in the case of the first embodiment, is connected with the cathode of the LED 40. The anode of the LED 40 is coupled with the positive power supply voltage through a resistor 172. The second fixed terminal of the switch 170 is coupled with the buffer amplifier and preemphasis circuit 110 through the preemphasis network 114.

The switch 170 is ganged with the switch 116b (as shown in FIG. 2), so that when the movable terminal of the switch 170 is connected with the input of the LED driver 64, the switch 116b is open, whereas when the movable terminal of the switch 170 is coupled with the input of the modulator 174, the switch 116b is closed. Accordingly, in a first mode of operation, the code group from the microcomputer is supplied only to the LED driver 64 and the RF transmitter is disabled. However, in the RF transmission mode of the unit 20, the LED 40 is disabled, so that relatively less power is consumed in the RF transmission mode of the second embodiment than in the case of the first embodiment of FIG. 2.

Although specific embodiments of the invention have been described in detail herein with reference to the accompanying drawings, it will be understood that the invention is not limited to those precise embodiments, and that various changes and modifications may be effected therein by one skilled in the art without departing from the scope or spirit of the invention as defined in the appended claims.

What is claimed is:

1. A method of remotely transmitting a control command to a device having a light sensor for receiving the control command in the form of a light energy signal, comprising the steps of:
   providing a remote control unit having a user operable control signal input on an enclosure thereof for receiving a control signal from a user representing a control command for the device, the remote control unit including a radio frequency generator within its enclosure coupled electrically with the user operable control signal input;
   actuating the user operable control signal input to input a control signal to the remote control unit representing the control command;
   producing a corresponding radio frequency remote control signal within said enclosure with the use of the radio frequency generator in response to the input control signal;

radiating the radio frequency remote control signal from the remote control unit;

receiving the radiated radio frequency remote control signal; and transmitting the control command in the form of a light energy signal to the light sensor of the device in response to the received radio frequency remote control signal to provide the command thereto.

2. The method of claim 1, wherein the step of actuating the user operable control signal input comprises actuating the control signal input manually.

3. The method of claim 2, wherein the step of actuating the control signal input manually comprises depressing at least one push button switch mounted on the enclosure.

4. The method of claim 1, wherein the step of producing a corresponding radio frequency remote control signal comprises producing a remote control modulation signal within said enclosure corresponding with the light energy signal, producing a radio frequency carrier with the radio frequency generator within said enclosure, and modulating the radio frequency carrier with the remote control modulation signal.

5. The method of claim 4, wherein the step of producing a remote control modulation signal comprises producing the remote control modulation signal based on one of a plurality of remote control modulation signal codes stored by modulation signal storage means corresponding with a respective light energy signal for controlling a corresponding operation of the device and with the control signal input by the user operable control signal input.

6. The method of claim 5, wherein the modulation signal storage means stores a plurality of remote control modulation signal codes for use in controlling a plurality of predetermined devices and the step of producing the remote control modulation signal comprises producing the remote control modulation signal based on one of the plurality of remote control modulation signal codes selected in response to the control signal for controlling a respective one of the plurality of predetermined devices.

7. The method of claim 6, further comprising the step of storing a remote control modulation signal code for controlling a respective one of said plurality of predetermined devices in the modulation signal storage means in response to a user command.

8. The method of claim 4, wherein the step of producing a remote control modulation signal comprises producing a remote control modulation signal corresponding with an infrared light remote control signal.

9. The method of claim 8, wherein the step of producing the remote control modulation signal comprises producing the remote control modulation signal corresponding with an infrared light remote control signal including an infrared carrier modulated by a pulse code modulated secondary carrier.

10. A system for remotely transmitting a control command to a first device having a light sensor for receiving a control signal in the form of a light energy signal for effecting a predetermined control of the first device, comprising:

a self-contained remote control unit including:
an enclosure;
a user operable control signal input on said enclosure for receiving a control signal from a user representing a control command for effecting a predetermined control of the first device;

radio frequency generator means coupled electrically with the user operable control signal input for producing a radio frequency signal within said enclosure in response to the control signal, the radio frequency signal corresponding with a light energy signal capable of effecting the predetermined control of the first device when supplied to a light sensor thereof; and means for radiating the radio frequency signal from the self-contained remote control unit;

the system further comprising receiving means for receiving the radiated radio frequency signal and providing the light energy signal to the light sensor of the first device based on the received radio frequency signal.

11. The system of claim 10, wherein the self-contained remote control unit is a hand-held remote control unit and the user operable control signal input includes at least one manually operable push button switch actuator mounted on the enclosure.

12. The system of claim 10, wherein the radio frequency generator means comprises means for producing a remote control modulation signal corresponding with the light energy signal, means for producing a radio frequency carrier and modulation means for modulating the radio frequency carrier with the remote control modulation signal to produce the radio frequency signal.

13. The system of claim 12, wherein the receiving means is operative to provide an infrared light signal modulated by a pulse code modulated secondary carrier as the light energy signal.

14. The system of claim 13, wherein the means for producing a remote control modulation signal is operative to produce the remote control modulation signal corresponding with the pulse code modulated secondary carrier, and the receiving means is operative to demodulate the radio frequency signal to separate the pulse code modulated secondary carrier therefrom.

15. A self-contained remote control unit for transmitting a radio frequency signal representing a predetermined control of a first device wirelessly to a receiver/light energy signal generator for transmitting a light energy signal corresponding with the radio frequency signal to the device to effect the predetermined control of the device, comprising:

an enclosure;
a user operable control signal input on the enclosure for inputting a user command signal representing the predetermined control of the device;

radio frequency generator means coupled electrically with the user operable control signal input for producing a radio frequency signal within the enclosure in response to the user command signal, the radio frequency signal corresponding with a light energy signal capable of effecting the predetermined control of the device represented by the user command signal; and means for radiating the radio frequency signal from the self-contained remote control unit to the receiver/light energy signal generator.

16. The self-contained remote control unit of claim 15, wherein the self-contained remote control unit is a hand-held remote control unit and the user operable control signal input includes at least one manually operable push button switch actuator mounted on the enclosure.

17. The self-contained remote control unit of claim 15, further comprising light energy transmission means for wirelessly transmitting a light energy remote control signal from the self-contained remote control unit to a light sensor of a second device.

18. The self-contained remote control unit of claim 17, further comprising selector means for selecting an operating mode of the self-contained remote control unit from one of a first mode in which the radio frequency generator means is enabled and a second mode in which the light energy transmission means is enabled and the radio frequency generator means is disabled.

19. The system of claim 18, wherein the selector means is operative to disable the light energy transmission means in the first mode.

20. The self-contained remote control unit of claim 15, wherein the radio frequency generator means comprises means for producing a remote control modulation signal within the enclosure corresponding with the light energy signal, and means for modulating a radio frequency carrier with the remote control modulation signal.

21. The self-contained remote control unit of claim 20, wherein the means for producing the remote control modulation signal comprises modulation signal storage means storing a plurality of remote control modulation signal codes each corresponding with a respective light energy signal for controlling a respective operation of the first device and a respective user command signal input by the user operable control signal input, the modulation signal storage means being operative to produce the remote control modulation signal based on one of the plurality of remote control modulation signal codes stored by the modulation signal storage means corresponding with a user command signal provided from the user operable control signal input.

22. The self-contained remote control unit of claim 21, wherein the modulation signal storage means stores a plurality of remote control modulation signal codes for use in controlling a plurality of predetermined devices and is operative to produce the remote control modulation signal based on one of the plurality of remote control modulation signal codes selected in response to the user command signal for controlling a respective one of the plurality of predetermined devices.

23. The self-contained remote control unit of claim 22, wherein the modulation signal storage means is operative to store a remote control modulation signal code for controlling a selected one of a plurality of predetermined devices in response to a user command.

24. The self-contained remote control unit of claim 20, wherein the means for producing a remote control modulation signal is operative to produce a remote control modulation signal corresponding with an infrared light remote control signal.

25. The self-contained remote control unit of claim 24, wherein the means for producing the remote control modulation signal is operative to produce an infrared light remote control signal including an infrared carrier modulated by a pulse code modulated secondary carrier.

26. A method of transmitting a serial bit encoded remote control signal for controlling a remotely controlled device via radiated radio frequency energy from a remote control unit having at least one user actuatable control signal input, comprising the steps of:

producing a serial bit encoded control signal in response to actuation of said control signal input by a user;

producing a power control signal having an ON state and an OFF state, such that the power control signal switches from its OFF state to its ON state approximately at the commencement of the serial bit encoded control signal and switches from its ON state to its OFF state approximately at the end of the serial bit encoded control signal;

producing a radio frequency carrier;

modulating the radio frequency carrier with the serial bit encoded control signal to produce a modulated radio frequency carrier;

enabling a supply of power for producing the modulated radio frequency carrier in response to the ON state of the power control signal;

disabling the supply of power for producing the modulated radio frequency carrier in response to the OFF state of the power control signal; and radiating the modulated radio frequency carrier for controlling said remotely controlled device.

27. The method of claim 26, wherein the step of producing a radio frequency carrier comprises producing the radio frequency carrier with the use of a radio frequency generator and controlling power supplied to the radio frequency generator in response to the power control signal.

28. The method of claim 26, wherein the step of producing the power control signal comprises maintaining the ON state of the power control signal from the commencement of the serial bit encoded control signal to the end thereof.

29. The method of claim 26, wherein the steps of enabling and disabling the supply of power for producing the modulated radio frequency carrier comprise enabling and disabling the supply of power from a power supply battery.

30. A remote control unit for transmitting a serial bit encoded remote control signal for controlling a remotely controlled device via radiated radio frequency energy, comprising:

a user operable control signal input for inputting at least one user command signal for effecting a predetermined control of the remotely controlled device;

control signal producing means for producing a serial bit encoded control signal in response to actuation of the control signal input by a user;

means for producing a power control signal having an ON state and an OFF state, such that the power control signal switches from its OFF state to its ON state approximately at the commencement of the serial bit encoded control signal and switches from its ON state to its OFF state approximately at the end of the serial bit encoded control signal;

RF generator means for producing a radio frequency carrier;

means for modulating the radio frequency carrier with the serial bit encoded control signal to produce a modulated radio frequency signal carrier;

enabling means for enabling a supply of power for producing the modulated radio frequency carrier in response to the ON state of the power control signal and for disabling the supply of power in response to the OFF state of the power control signal; and means for radiating the modulated radio frequency carrier for controlling the remotely controlled device.

31. The remote control unit of claim 30, further comprising a power supply battery, and wherein the enabling means is operative to control a supply of power from the power supply battery for producing the modulated radio frequency carrier.

32. The remote control unit of claim 31, wherein the enabling means is operative to control a supply of power from the power supply battery for producing the radio frequency carrier.

33. The remote control unit of claim 30, wherein the means for producing a power control signal is operative to maintain the ON state thereof from the commencement of the serial bit encoded control signal to the end thereof.

34. The remote control unit of claim 30, further comprising an enclosure, and wherein the user operable control signal input comprises a user accessible input actuator on the enclosure to receive a user command, and the RF generator means is operative to produce the radio frequency carrier within the enclosure.

35. The remote control unit of claim 30, wherein the control signal producing means is operative to produce the serial bit encoded control signal corresponding with a light energy signal for controlling a predetermined device.

36. The remote control unit of claim 35, in combination with receiving means for receiving the modulated radio frequency carrier radiated by the remote control unit and providing the light energy signal to the predetermined device in response to the received modulated radio frequency carrier.

37. The remote control unit of claim 30, further comprising light energy transmission means for transmitting a light energy remote control signal from the remote control unit to a light sensor of a further remote controlled device.

38. The remote control unit of claim 37, wherein the light energy transmission means comprises a light energy emitter for producing light energy and means for modulating light energy with the serial bit encoded control signal.

39. A self-contained remote control unit for transmitting a control signal to a device representing a predetermined control thereof via a selected one of a radiated radio frequency signal and a light energy signal, comprising:
an enclosure;
a user operable control signal input on the enclosure for inputting a user command signal representing the predetermined control of the device;
radio frequency generator means for producing a radio frequency signal within the enclosure in response to the user command signal and representing a predetermined control of a device;
means for radiating the radio frequency signal from the self-contained remote control unit; and
light energy transmission means for wirelessly transmitting a light energy signal from the self-contained remote control unit in response to the user command signal and representing a predetermined control of a device.

40. The self-contained remote control unit of claim 39, further comprising selector means for selecting an operating mode of the self-contained remote control unit from one of a first mode in which the radio frequency generator means is enabled and a second mode in which the light energy transmission means is enabled and the radio frequency generator means is disabled.

41. The self-contained remote control unit of claim 40, wherein the selector means is operative to disable the light energy transmission means in the first mode.

* * * * *

REEXAMINATION CERTIFICATE (3620th)

United States Patent [19]
Borchardt et al.

[11] B1 5,383,044
[45] Certificate Issued Sep. 1, 1998

[54] SYSTEMS, METHODS AND APPARATUS FOR TRANSMITTING RADIO FREQUENCY REMOTE CONTROL SIGNALS

[75] Inventors: Robert L. Borchardt, New York; William T. McGreevy, Babylon; Efrain Rodriguez, Brooklyn, all of N.Y.

[73] Assignee: Recoton Corporation, Long Island City, N.Y.

Reexamination Request:
No. 90/004,601, Apr. 9, 1997

Reexamination Certificate for:
Patent No.: 5,383,044
Issued: Jan. 17, 1995
Appl. No.: 947,705
Filed: Sep. 18, 1992

[51] Int. Cl.⁶ .................................................. H04B 10/00
[52] U.S. Cl. .................................. 359/145; 340/825.72

[58] Field of Search .............................. 359/145, 142, 359/146, 147, 148, 149, 154; 340/825.72, 825.69; 455/352, 151.4; 341/176

[56] References Cited

U.S. PATENT DOCUMENTS 5,227,780  7/1993  Tigwell ........................ 340/825.72

*Primary Examiner*—Dang Ton

[57] ABSTRACT

Systems, methods and devices are provided for remotely transmitting a control command to a device having a light sensor for receiving the control command in the form of a light energy signal. A radio frequency remote control signal is produced within an enclosure of a remote control unit (such as a hand-held remote control unit) and is radiated therefrom to a radio frequency receiver. The receiver converts the received signal to a light energy signal which it applies to the light sensor of the device to provide the command thereto.

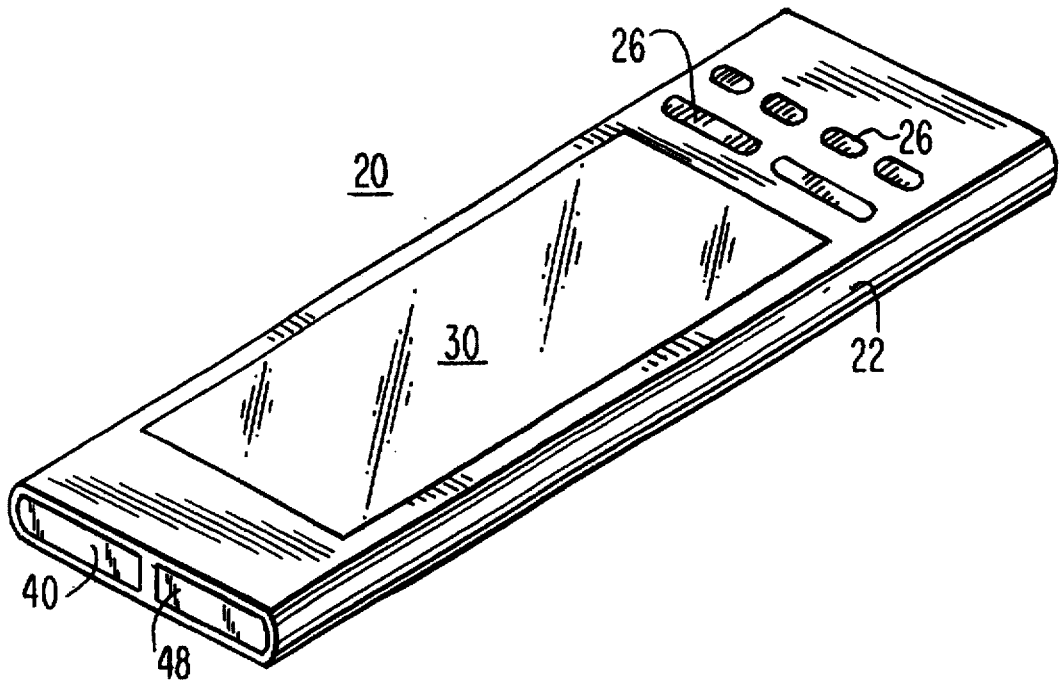

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 10–41 is confirmed.

Claims 1 and 4 are determined to be patentable as amended.

Claims 2–3 and 5–9, dependent on an amended claim, are determined to be patentable.

1. A method of remotely transmitting a control command to a device having a light sensor for receiving the control command in the form of a light energy signal, comprising the steps of:

providing a remote control unit having a user operable control signal input on an enclosure thereof for receiving a control signal from a user representing a control command for the device, the remote control unit including a radio frequency generator within its enclosure coupled electrically with the user operable control signal input;

actuating the user operable control signal input to input a control signal to the remote control unit representing the control command;

producing a corresponding radio frequency remote control signal within said enclosure with the use of the radio frequency generator in response to the input control signal, *said step of producing a corresponding radio frequency remote control signal including producing a remote control modulation signal within said enclosure corresponding with the light energy signal;* radiating the radio frequency remote control signal from the remote control unit;

receiving the radiated radio frequency remote control signal; and transmitting the control command in the form of a light energy signal to the light sensor of the device in response to the received radio frequency remote control signal to provide the command thereto.

4. The method of claim 1, wherein the step of producing a corresponding radio frequency remote control signal *further* comprises [producing a remote control modulation signal within said enclosure corresponding with the light energy signal,] producing a radio frequency carrier with the radio frequency generator within said enclosure[,] and modulating the radio frequency carrier with the remote control modulation signal.

* * * * *